United States Patent
Deura et al.

(10) Patent No.: US 8,057,737 B2
(45) Date of Patent: Nov. 15, 2011

(54) FORGING STEEL AND ITS MANUFACTURING METHOD, AND FORGED PARTS

(75) Inventors: Tetsushi Deura, Kobe (JP); Motohiro Nagao, Takasago (JP); Atsushi Tomioka, Takasago (JP); Shogo Fukaya, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 363 days.

(21) Appl. No.: 12/306,091

(22) PCT Filed: Apr. 24, 2007

(86) PCT No.: PCT/JP2007/058848
§ 371 (c)(1),
(2), (4) Date: Dec. 22, 2008

(87) PCT Pub. No.: WO2007/148475
PCT Pub. Date: Dec. 27, 2007

(65) Prior Publication Data
US 2009/0274574 A1 Nov. 5, 2009

(30) Foreign Application Priority Data

Jun. 21, 2006 (JP) .................................. 2006-171976
Mar. 7, 2007 (JP) .................................. 2007-057746

(51) Int. Cl.
*C22C 38/22* (2006.01)
*C22C 38/24* (2006.01)
*C22C 38/44* (2006.01)
*C22C 38/46* (2006.01)
*C21C 7/076* (2006.01)

(52) U.S. Cl. ........ 420/111; 420/105; 420/109; 148/334; 148/335; 75/520

(58) Field of Classification Search .......... 420/104–111; 148/333–335, 320, 904; 75/520
See application file for complete search history.

(56) References Cited

U.S. PATENT DOCUMENTS

| 5,651,937 A | 7/1997 | Descaves |
| 2005/0257644 A1 | 11/2005 | Nakai et al. |
| 2006/0096416 A1 | 5/2006 | Nakai et al. |
| 2006/0108027 A1 | 5/2006 | Sugimura et al. |

FOREIGN PATENT DOCUMENTS

| EP | 1 331 278 A1 | 7/2003 |
| EP | 1 602 742 A1 | 12/2005 |
| EP | 1 662 016 A1 | 5/2006 |

(Continued)

OTHER PUBLICATIONS

Machine-English translation of Japanese patent 2004-225128, Kagawa Takanori et al., Aug. 12, 2004.*
Machine-English translation of Japanese patent 2003-213386, Kimura Seii et al., Jul. 30, 2003.*
Machine-English translation of Japanese patent 07-238339, Kawachi Yuji et al., Sep. 12, 1995.*

(Continued)

*Primary Examiner* — Deborah Yee
(74) *Attorney, Agent, or Firm* — Oblon, Spivak, McClelland, Maier & Neustadt, L.L.P.

(57) ABSTRACT

A forging steel has a dissolved Mg concentration within the range of 0.04-5 ppm by mass and a dissolved Al concentration within the range of 50-500 ppm.

11 Claims, 4 Drawing Sheets

FOREIGN PATENT DOCUMENTS

| | | |
|---|---|---|
| JP | 6-158226 | 6/1994 |
| JP | 07 188853 | 7/1995 |
| JP | 07 238342 | 9/1995 |
| JP | 2000 087179 | 3/2000 |
| JP | 2000 129402 | 5/2000 |
| JP | 2002 20842 | 1/2002 |
| JP | 2002 30387 | 1/2002 |
| JP | 2002-194502 | 7/2002 |
| JP | 2003 27189 | 1/2003 |
| JP | 2003 113448 | 4/2003 |
| JP | 2003 213386 | 7/2003 |
| JP | 2004 225128 | 8/2004 |
| JP | 57 59295 | 4/1982 |
| JP | 58 35255 | 3/1983 |

OTHER PUBLICATIONS

Office Action issued Nov. 10, 2010, in China Patent Application No. 200780017290.9 (with English and Japanese translation).

Extended European Search report issued Dec. 29, 2010, in Application No. / Patent No. 07742283.0-2122 / 2036992 PCT/JP2007058848.

"Progress and Improvement of Crankshaft", Journal of the Marine Engineering Society of Japan, vol. 8, No. 10, pp. 53-60 (1973) with partial English translation.

Omata, S. et al., "Research on Fatigue Strength of High Tensile Steels for Crankshaft", Journal of the JIME, vol. 36, No. 6, pp. 385-390 (2001).

* cited by examiner

US 8,057,737 B2

FORGING STEEL AND ITS MANUFACTURING METHOD, AND FORGED PARTS

CROSS-REFERENCE TO RELATED APPLICATIONS

The present application is a 35 USC §371 National Stage patent application of International patent application PCT/JP07/58848, filed on Apr. 25, 2007, which claims priority to Japanese patent applications JP 2007-057746, which was filed on Mar. 7, 2007 and JP 2006-171976, which was filed on Jun. 21, 2006.

TECHNICAL FIELD

This invention relates to forging steel and its manufacturing method, and forged parts obtainable by using the above forging steel, and in particular, to the forging steel with the inclusions existing in the steel refined particularly and the manufacturing method for such forging steel and the forged parts obtainable by using such forging steel stated in the foregoing. While the forged parts made from the forging steel in the present invention are being used effectively and widely in such industrial fields as machinery, ships and vessels, electrical equipment, etc., explanation hereunder is made centering on an application to the crankshaft used for a power transmission member in a marine driving source as an example of typical application.

BACKGROUND ART

The large-size crankshaft used as the power transmission member in a marine driving source requires superior fatigue characteristics that can hardly cause fatigue breakdown even under a very severe use environment.

As a method of improving fatigue characteristics of the crankshaft, Non-patent Document 1 describes that improvement in fatigue characteristics was tried by improving fatigue characteristics with free command of processing technology. To be more concrete, the Non-patent Document 1 indicates that the RR (Roedere Ruget) method was adopted to achieve a remarkable betterment in fatigue strength as compared with a crankshaft manufactured by free forging and also that cold roll processing was applied for improvement of fatigue strength.

Non-patent Document 2 examines about possibility of improving fatigue characteristics of low-alloy steel. To be more precise, the Non-patent Document 2 mentions that (1) the inclusions in the steel are apt to become a starting point of fatigue breakdown and such inclination is likely to become more apparent as steel is developed to have higher strength; (2) the larger the size of the inclusion is, the lower the fatigue strength is likely to be; and (3) any steel material containing elongated inclusions has a tendency of easily showing anisotropy in fatigue strength.

However, the above reports do not go as far as to disclose concrete means about how to realize spheronization in morphology of inclusions and make it smaller. It is neither made clear what kinds and sizes of inclusions are to be controlled. Therefore, further studies seem to be required to realize morphology control of inclusions useful for enhancement of fatigue characteristics.

Incidentally, various methods have so far been suggested in regard to the method of morphology control for the inclusions. For example, in Patent Document 1, some suggestion is made about a method in which both sulfide and oxide are reduced in amount and inclusions are controlled in morphology as a means of producing structural low-alloy steel having excellent features in point of lamellar tear resistivity and hydrogen induced cracking resistivity. In more details, the suggestion includes that in order to suppress generation of Mn sulfide which is harmful to the lamellar tear resistivity and hydrogen induced cracking resistivity, it is effective to reduce the amount of sulfur and oxygen content while adding Ca and Mg content at the same time.

In Patent Document 2, it is described that addition of Mg and Ca works effectively to suppress growth of MnS which is apt to elongate during hot rolling and also growth of inclusions of $Al_2O_3$ and its relatives which tend to form into clusters, and further to carry out morphology control of the inclusions such as particle size refinement.

Patent Document 3 and Patent Document 4 show that by the extreme size refinement of the oxide type inclusions, it is possible to increase surface fatigue strength and gear bending fatigue strength in relation to gear material. To be more precise, these documents suggest that MgO and $MgO.Al_2O_3$, which are less coalesced, should be created as the oxide type inclusions. It is also made clear that replacing a part of sulfide MnS with (Mn.Mg)S can help suppress elongating tendency of the inclusions and reduce anisotropy of mechanical strength.

Patent Document 5 discloses that as sulfide, MnS, CaS, MgS, (Ca,Mn)S, and (Ca,Mg,Mn)S were made to exist for the purpose of obtaining machine structural steel with superior machinability. The Patent Document 5 clarifies that if the morphology of sulfide can be controlled by having REM, Ca and Mg contained, it becomes possible to suppress anisotropy of mechanical property and also to enhance the machinability to a level higher than that of S-contained free cutting steel.

However, the morphology control technology for the above inclusions are not targeting at forged parts used under such severe environmental conditions as the power transmission member in the marine driving source is subjected to. Therefore, it is now required to study and establish an original inclusion control method targeted at forging steel used for manufacturing of forged parts provided with much upgraded fatigue characteristics.

[Non-patent Document 1] "Progress and Improvement of Crankshaft," Journal of the Marine Engineering Society of Japan, October 1973, Vol. 8, No. 10, pp. 54-59
[Non-patent Document 2] "Research on Fatigue Strength Characteristics of High-strength Crankshaft Materials," Journal of the Marine Engineering Society of Japan, 2001, Vol. 36, No. 6, pp. 385-390
[Patent Document 1] Japanese Examined Patent Application Publication No. 58-35255 (JP-B-58-35255)
[Patent Document 2] Japanese Examined Patent Application Publication No. 57-59295 (JP-B-57-59295)
[Patent Document 3] Japanese Unexamined Patent Application Publication No. 07-188853 (JP-A-07-188853)
[Patent Document 4] Japanese Unexamined Patent Application Publication No. 07-238342 (JP-A-07-238342)
[Patent Document 5] Japanese Unexamined Patent Application Publication No. 2000-87179 (JP-A-2000-87179)

DISCLOSURE OF THE INVENTION

Problem to be Solved by the Invention

This invention has been made in view of the forgoing circumstances and has it as an object to provide forging steel with refined inclusions so as to make available forged parts having excellent fatigue characteristics and also to provide the useful method by which such forging steel can be manufactured. Still another object of this invention is to provide forged parts (particularly crankshafts of solid construction) that are obtainable from the use of the abovementioned forging steel and can exhibit excellent fatigue characteristics because of the inclusions being highly refined.

Means for Solving the Problem

The forging steel according to the present invention that has successfully attained the abovementioned objects has a dissolved Mg concentration in the steel of 0.04-5 ppm (here and hereafter, ppm denotes "ppm by mass") and, at the same time, has an important point in that the dissolved Al concentration in the steel is 50-500 ppm. By the way, "dissolved Al concentration" or "dissolved Mg concentration" means the concentration of Al or Mg existing in the steel as a solid solution without having developed to a state of compound. The concentration value of the dissolved elements can be measured, for example, by the secondary ion mass spectrometry (SIMS).

The forging steel according to the present invention should preferably satisfy the requirements (a) that the oxide type inclusions contained in the steel should have an average composition to satisfy the formulas (1) and (2) shown below; (b) that assuming the cross-sectional area of the oxide type inclusions contained in the steel is A ($\mu m^2$), the average value of $\sqrt{A}$ should be 160 μm or below.

$$[MgO]+[Al_2O_3] \geq 40\% \quad (1)$$

$$[MgO] \geq 5\% \quad (2)$$

Where [MgO] and [$Al_2O_3$] respectively denote a contained amount (% by mass) of MgO and $Al_2O_3$ in the oxide type inclusions.

Generally, it is preferable that the above-mentioned forging steel and forged parts should comply with the component composition mentioned below in order to secure excellent strength and toughness at all.

"The steel is to contain C: 0.2-1.0% (hereafter, % denotes '% by mass'); Si: 0.05-0.6%; Mn: 0.2-1.5%; Ni: 4% or below (but not including 0%); Cr: 0.5-4%; Mo: 0.1-1.5%; V: 0.005-0.3%; and the rest being Fe and inevitable impurities."

The present invention covers forged parts manufactured from the above forging steel, and particularly the crankshaft of solid construction if manufactured from the forging steel according to the present invention will exhibit superior fatigue characteristics.

On the other hand, the manufacturing method for forging steel has the essential point in that in manufacturing forging steel, the concentration of MgO in the top slag at the molten steel processing should be kept at 5% or more and also that the Al concentration in the molten steel should be controlled so that the dissolved Al in the steel can maintain a concentration of 50-500 ppm.

Effect of the Invention

This invention is configured as described above, and by adjusting the dissolved Mg concentration and the dissolved Al concentration in the steel, it has become possible to control the morphology of the inclusions formed and thereby to provide forging steel with refined inclusions. The forged parts available from the use of such forging steel can be expected to show excellent fatigue characteristics and prove particularly useful for large-size forged parts such as crankshafts for ships and vessels.

BEST MODE FOR CARRYING OUT THE INVENTION

Figure 1:
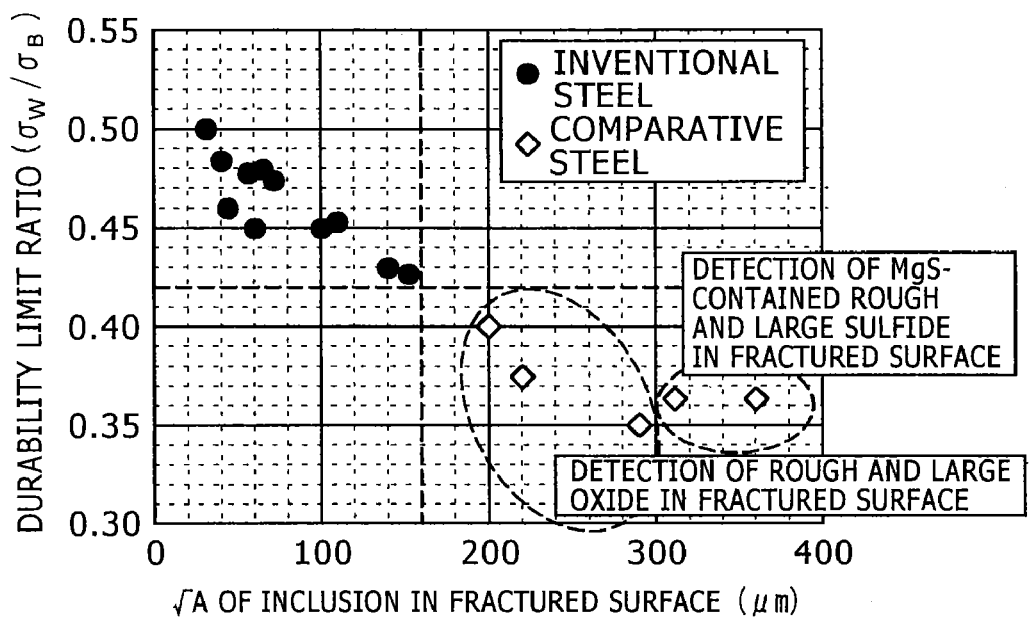
FIG. 1 is a graph showing the relation between A of inclusions in fracture surface and endurance limit ratio.

Under the abovementioned circumstances, the inventors of the present invention have been making studies from various angles, while setting our final target at enhancement of fatigue characteristics of the forged parts which are subject to use under severe environment. In particular, large-size steel ingots (for example, of a size more than 20 tons) which were hard to achieve the targeted level of fatigue strength required us to proceed with the studies from a different angle than before.

As the result of the studies, it has become clear that the reduction in fatigue strength is brought by coarse and large inclusions consisting mainly of MgS, and that the creation of the coarse and large inclusions are much dependent on the dissolved Mg concentration and the dissolved Al concentration. It has been also found out that the abovementioned creation of the coarse and large inclusions can be suppressed if the dissolved Mg concentration and the dissolved Al concentration are controlled within a certain prescribed range, which finding has paved the way to the achievement of the present invention.

The inventors have also studied about small-size steel ingots (20 kgs) and large-size steel ingots (20 tons) to realize that the dissolved Mg concentration and the dissolved Al concentration in the steel are instrumental in the composition of oxides without regard to the size of the steel ingots. It has become also clear that by controlling these concentrations within an appropriate range, creation of the inclusions that has a tendency of growing coarse and large, such as $Al_2O_3$ and $CaO.Al_2O_3$, can be suppressed, and instead, composition can be controlled so as to form a MgO contained oxide which is less coalesced.

It has become also clear that in order to control the dissolved Mg concentration in the steel within an appropriate range, it is sufficient to control the MgO concentration in the top slag and the Al concentration in the molten steel respectively at an appropriate level.

The manufacturing method according to the present invention makes it the keynote that at the stage of molten steel processing, the MgO concentration in the top slag and the Al concentration in molten steel should be properly adjusted. Explanation is going to be made hereafter of the functional effect of the present invention, while explanation is also given to the fundamental procedures of the molten steel processing stage.

In the molten steel processing, the raw material is first loaded in an electric furnace for heating and melting, and after that, decarburization and dephosphorization are carried out by oxygen blowing in which oxygen is injected from a lance. After completion of oxygen blowing, the molten steel is transferred to a ladle for molten steel processing by means of a molten steel processing apparatus such as an LF (Ladle Furnace). Prior to the molten steel processing, the slag materials (slag making agents) including CaO, MgO, $Al_2O_3$, etc., are added onto the surface of the molten steel at a predetermined blend ratio and melt-blended, forming slag (top slag) on the surface of the molten steel.

In such molten steel processing, the molten steel is agitated by bottom blowing gas agitation or other methods to make adjustment of temperature and major compositions while being agitated and also to carry out deoxidation, desulfurization, and other processing by adding a deoxidizing agent to the molten steel. Furthermore, if necessary, the vacuum degassing processing is applied to the molten steel by means of lid degassing equipment, tank degassing equipment, circulating degassing equipment, and other like equipment (e.g., the RH equipment), thereby accelerating dehydrogenation and desulfurization from the molten steel. When the molten steel has reached a prescribed level in respect to composition, temperature, and cleanliness, the molten steel processing is completed, opening the door for casting steel ingots by the top pouring casting process and the bottom pouring casting process.

The steel ingots obtained from the above casting process are then hot forged into round bars and other shapes of intermediate products. After forging, these intermediate products go through in-process inspection in regard to composition, defect, and cleanliness before being put to hot forging again so as to forge solid type crankshafts, journals, and other large-size product figurations. Succeedingly, the forged products are given heat treatment as may be required for particular characteristics of each product and finished by machining to become the end products.

The more precise procedures for producing a solid type crankshaft from the above ingot may be well represented by the following processes. That is, the steel ingot after solidification is taken out from the casting mold and heated to a temperature of 1150° C. or over. The steel ingot is then formed by hot forging at a forging ratio of 3 into a figuration of round bar or stepped bar. In this forging of steel ingot, compression of defects inherent in the ingot may well be made by applying compression to the ingot in the direction of the height followed by extend forging thereafter to a prescribed length. After hot forging, the ingot is processed into the figuration of solid type crankshaft. In forging to form solid type crankshaft, the throw portion may well be forged either one by one or a plurality of throws at the same time by placing the whole unit of crankshaft in a mold. After the forging, the crankshaft is finished by machining so that it may become complete as a solid type crankshaft with dimensions as prescribed. It may as well be practiced to process the ingot by hot forging into a stepped figuration and further into a solid type crankshaft by machining.

The method according to the present invention is to properly control the manufacturing conditions especially in the molten steel processing. The method is also to control the concentrations of the dissolved Mg and the dissolved Al by maintaining the composition of the top slag and the concentration of Al added as a deoxidizer within appropriate ranges. Controlling the concentrations of the dissolved Mg and the dissolved Al within proper ranges respectively makes it possible to get the oxides created during molten steel processing and casting nicely regulated by virtue of the composition being easily and finely dispersible and eventually to enable the inclusions in the product after hot forging to become refined and end up with much enhanced fatigue strength of the product. Hereafter, explanation is given about respective requirements prescribed in the present invention.

It is determined in the method according to the present invention that the concentration of MgO in the top slag in the above molten steel processing should be maintained at 5% or over and that the concentration of Al in the molten steel should be adjusted so that the concentration of dissolved Al in the steel may stay within 50-500 ppm. By satisfying these requirements, it is possible to control the concentration of the dissolved Mg in the steel at 0.04-5 ppm (see FIGS. 4 and 5), even if Mg-contained alloy is not directly added to the molten steel. Normally, the top slag has CaO—$Al_2O_3$—MgO—$CaF_2$.as the main composition, and the above concentration of MgO denotes the ratio against the above whole composition.

In case the Mg alloy is directly added to the molten steel, there is likelihood of forming a local region where the concentration of Mg is observed high, in the ladle of molten steel, though for a short time, and creating coarse and large sulfide such as MgS. If such coarse and large sulfide is coagulated together with other inclusions and remains in the product, the fatigue strength of forged parts might be remarkably deteriorated.

If the concentration of the dissolved Al in the steel becomes less than 50 ppm, dissolved oxygen amount rises and the oxide crystallizing during solidification increases in number of pieces, resulting in cleanliness made worse. Also, when the concentration of Al exceeds 500 ppm, the concentration of dissolved oxygen decreases and, at the same time, the concentration of dissolved Mg increases to as high a level as over 5 ppm (further details to be dealt with later).

In order to control the concentration of dissolved Al in the steel within the range indicated above, it is necessary to analyze the concentration of Al in the molten steel and gain an understanding on the relations between the concentration of Al in the molten steel and the concentration of Al in the steel. Based on the knowledge, addition of Al or Al alloy may be made to the molten steel so that the final concentration of dissolved Al in the steel may fall within the range of 50-500 ppm (so that the final concentration of Al in the molten steel may become a concentration value corresponding to the foregoing).

Figure 2:
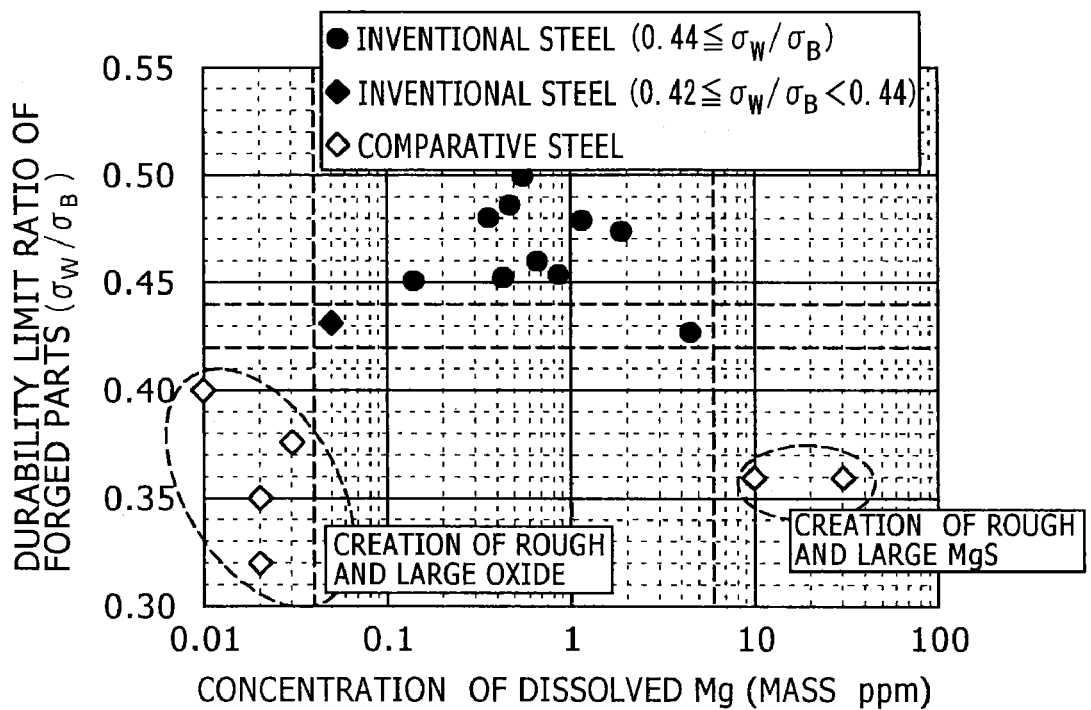
FIG. 2 is a graph showing the relation between dissolved Mg concentration in the steel and endurance limit ratio.
Figure 4:
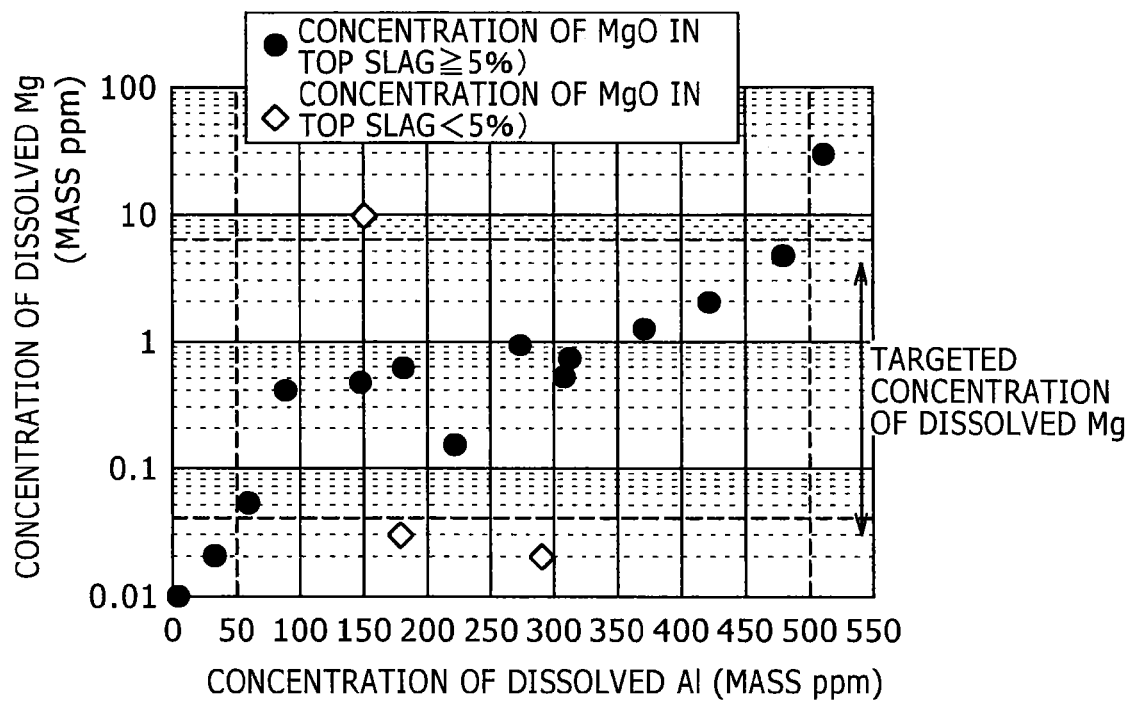
FIG. 4 is a graph showing the effect which the dissolved Al concentration in the steel gives to the dissolved Mg concentration in the steel, in relation to the concentration of MgO in the slag.

The forging steel obtained by the above method has the concentration of dissolved Mg in the steel within the range of 0.04-5 ppm, and at this range, most of deoxidation products existing in the steel turn out to be spinel or other MgO-contained oxide contributing to a significant increase of fatigue strength of the steel (see FIGS. 2 and 4). To put it conversely, if the concentration of dissolved Mg in the forging steel is less than 0.04 ppm, the composition of inclusions becomes $Al_2O_3$-rich, leading to occurrence of solidification and coalescence phenomenon. Also, if the concentration of dissolved Mg in the forging steel is more than 5 ppm, MgS, MgO, etc., are generated during solidification in a large amount, resulting that these compounds grow to become coarse and large inclusions affecting the cleanliness to degrade.

As mentioned above, by controlling the concentration of the dissolved Mg in the steel within an appropriate range, the endurance limit ratio (fatigue strength $\sigma_W$/tensile strength $\sigma_B$), to which further reference is to be made later, is to show such an excellent fatigue characteristics as 0.42 or more. Preferred range of the concentration of this dissolved Mg is about 0.1-2 ppm, and with this range kept controlled, still more excellent fatigue characteristics (0.44 or over expressed by the above endurance limit ratio) can be exhibited.

Incidentally, the wet method is generally adopted to analyze Al concentration and Mg concentration, but because the wet method cannot fully avoid dissolution of oxides and sulfides, it is difficult to accurately determine the concentration of Al or Mg which is dissolved in the form of atoms in the steel. To determine the concentration of oxides excluding Al, there is a method to use a soluble Al (sol. Al). Even this "sol. Al" method, however, cannot be said to be perfect in determining an accurate concentration of dissolved Al, because elution of Al from CaO—$Al_2O_3$ or other like oxides cannot be disregarded. Therefore, from the viewpoint that the thermodynamic equilibrium between a dissolved element and an oxide is very important, the present invention has adopted SIMS (Secondary Ion Mass Spectrometry) as an accurate measuring method of dissolved elements (the "dissolved Al concentration" and the "dissolved Mg concentration").

Figure 3:
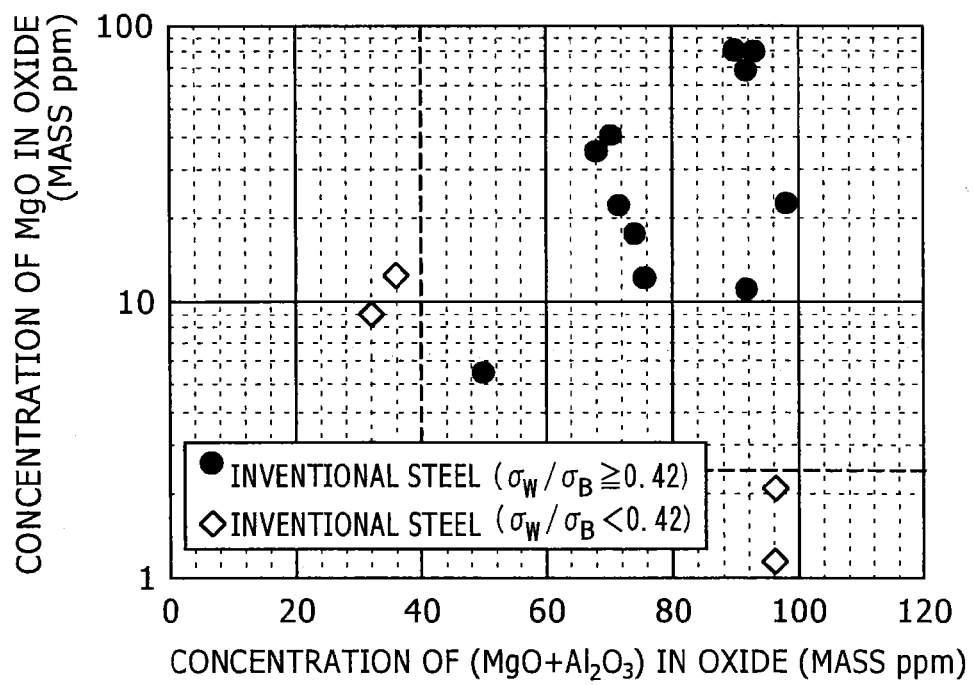
FIG. 3 is a graph showing the effect that the concentration of ($MgO+Al_2O_3$) in the oxides and the concentration of Mg in the oxides give to endurance limit ratio.

With regard to the forging steel according to the present invention, it is preferred that the inclusions of oxide family contained in the steel should have average compositions that are able to satisfy the following formulas (1) and (2) (refer to FIG. 3).

$$[MgO]+[Al_2O_3] \geq 40\% \quad (1)$$

$$[MgO] \geq 5\% \quad (2)$$

Provided [MgO] and [$Al_2O_3$] respectively denote the contained amounts (% by mass) of MgO and $Al_2O_3$.

The inclusions, when having the composition of oxide family conforming to the above formulas (1) and (2), turn out to be MgO-contained oxides such as spinel, MgO, etc. Since these MgO-contained oxides have a better wettability with molten steel in comparison with $Al_2O_3$, it becomes possible to suppress coagulation and coalescence phenomena occurring to the inclusions and thereby prevent formation of coarse and large inclusions that are likely to cause deterioration of fatigue characteristics of the steel.

With regard to the forging steel according to the present invention, assuming that the cross-sectional area of the inclusions of oxide family contained in the steel material is A ($\mu m^2$), it is preferable that the average value of $\sqrt{A}$ should be 160 μm or below (see FIG. 1). If this kind of requirements can be satisfied, the inclusion which often becomes the starting point for destruction of the steel can be held smaller in size leading to enhanced fatigue strength and toughness in the end products (forged parts). Contrastingly, the existence of coarse and large sulfides or coarse and large oxides is undesirable for improvement of the fatigue strength (refer to FIG. 2).

The present invention is characterized, as described above, in that adjustment is applied to the dissolved component in the molten steel with a view to refining the inclusion in the steel, even though no particular limitation is provided in respect of the basic composition of the forging steel. However, in order to make it certain that a crankshaft, for example, or any other end product will have required strength and toughness and further the enhanced fatigue strength that is set out as the final target in the present invention, it is desirable for the steel material to satisfy the basic composition shown below.

[C: 0.2-1.0%]

C is the element to contribute to improvement of strength, and to secure enough strength it should be contained at 0.2% or more, preferably at 0.3% or more, or more preferably at 0.36% or more. However, if the amount of C is excessive, it will tend to deteriorate toughness, so that C should be held at 1.0% or less, preferably at 0.5% or less, or more preferably at 0.45% or less.

[Si: 0.05-0.6%]

Si also functions as a strength enhancing element, and to secure enough strength it should be contained at 0.05% or more, preferably at 0.1% or more, or more preferably at 0.2% or more. However, if the amount of Si is excessive, it will tend to cause inverted V-shape segregation to become intensive making it difficult to obtain clean steel ingots, so that Si should be held at 0.6% or less, or preferably at 0.4% or less.

[Mn: 0.2-1.5%]

Mn is another element enhancing strength besides boosting hardenability, and to secure enough strength and hardenability it should be contained at 0.2% or more, preferably at 0.4% or more, or more preferably at 0.9% or more. However, if the amount of Mn is excessive, it will tend to foster inverted V-shape segregation, so that Mn should be held at 1.5% or less, preferably at 1.2% or less, or more preferably at 1.1% or less.

[Ni: 4% or less (not including 0%)]

Ni is useful as an element for enhancing toughness, but since excessive amount of Ni obliges increase in cost, Ni should be held at 4% or less, or preferably at 2% or less.

[Cr: 0.5-4%]

Cr is an element useful for increasing toughness as well as enhancing hardenability, and these functions are effectively exhibited when Cr is contained at 0.5% or more, preferably at 0.9% or more, or more preferably at 1.5% or more. However, if the amount of Cr is excessive, it will tend to foster inverted V-shape segregation to become intensive making it difficult to obtain clean steel ingots, so that Si should be held at 4% or less, or preferably at 2.5% or less.

[Mo: 0.1-1.5%]

Mo is an element to effectively act on betterment of all of hardenability, strength, and toughness, and for the effective exhibition of these functions, Mo should be contained in the steel at 0.1% or more, preferably at 0.15% or more, or more preferably at 0.20% or more. However, since Mo has a low equilibrium distribution coefficient which leads to easy occurrence of micro segregation, Mo should be held at 1.5% or less.

[V: 0.005-0.3%]

V is effective for enhanced precipitation and structural refinement, and also is useful for strength reinforcement. For the effective exhibition of these functions, V should be contained at 0.005% or more. But if the amount of V is excessive, the above effects become saturated ending up economically in vain. Therefore, V should be held at 0.3% or less, or preferably at 0.15% or less.

The preferred basic composition of the forging steel according to the present invention is as shown in the foregoing paragraphs. The remaining portion not covered in the above composition is virtually Fe, but it is allowable, of course, that a slight amount of unavoidable impurities is contained in the forging steel. Furthermore, it is also possible that the forging steel in which any other elements are positively added may be used insofar as such addition of other elements does not adversely affect the above-mentioned functions and effects of the present invention. Examples of other elements allowable for positive addition may be listed as follows: "B" (it shows a hardenability improving effect), "Ti" (it has a deoxidization effect), and "W, Nb, Ta, Cu, Ce, La, Zr, and Te" (solid solubility intensifying elements or precipitation enhancing elements). These elements can be added singularly or in a plurality in combination, but in any case it is desirable that the total amount should be held at about 0.1% or below.

The present invention is inclusive of forged parts or products available from the use of the forging steel of the present invention, although no limitation is provided as to the manufacturing method of these parts or products. For example, the following processes may be implemented in the order described: synthesizing of steel in melted state with an electric furnace to prepare steel with target composition→degassing process by vacuum refining to remove S and other impure elements and O and other gas contents→ingot making process→ingot heating and forging process→in-process inspection, heating, and forging into required product figuration→homogenizing anneal and hardening process→finishing machining process.

Particularly when a crankshaft is manufactured as a forged part, manufacturing the crankshaft in a solid structure is a favorable thing as it enables the surface layer of the shaft to be occupied with the portion of high cleanliness and to acquire excellent characteristics in strength and fatigue. In this case, manufacturing method for the solid type crankshaft is not particularly limited, but recommendable is to manufacture the crankshaft following R. R. and T. R. forging methods (wherein forging processing is made in such a state that the center of axle of the ingot is consonant with the shaft center of the crankshaft and also that the portion judged by center segregation to be likely to cause deterioration in characteristics may compose the entire shaft center of the crankshaft in a unified manner).

As another forging processing method, the crankshaft may as well be manufactured by the free forging method (the crank arm and the crank pin are manufactured as a unified block by forging, and formation of figuration of the crankshaft is conducted by gas cutting and machining).

The forging steel of the present invention shows an excellent fatigue characteristics because of its inclusions being extremely refined. It is, therefore, effectively usable as material for forging formation of marine intermediate shafts, marine screw shafts, throws of assembly type crankshafts, pressure tanks, hollow articles, and other high-strength products, as well as crankshafts.

Hereafter, some embodiments are presented for more concrete explanation of the present invention. In the nature of the case, the present invention is by no means limited to the embodiments, but it can be implemented with proper modifications insofar as such modifications are within the scope conforming to the purport of what is mentioned above and below herein. All of such modifications shall be regarded an integral part of the technical scope of the present invention.

Embodiment

In an electric furnace, 20-100 tons of scrap material was melted and tapped to fill the ladle. Then, slag forming agents, such as CaO, $Al_2O_3$, and MgO, were added to the surface of the molten steel to complete formation of top slag in the prescribed composition. After that, by using the ladle-heating type refining equipment with a bottom-blowing agitator, molten steel processing was carried out. In this molten steel processing, Al was added to deoxidize molten steel, and by means of vacuum processing with the lid degassing equipment, dehydrogenating was conducted. In the course of molten steel processing, sampling of molten steel was done at proper timing for measurement of Al concentration in the molten steel, and Al was additionally fed as may be necessary so as to keep the Al concentration always within a prescribed range.

In this respect, it was necessary to gain an understanding by preliminary experiments regarding how the dissolved Al concentration in the steel material measured by the secondary ion mass spectrometry (SIMS) corresponded with the Al concentration in the molten steel measured by the quick analysis with the emission analysis equipment. With the above knowledge on hand, control was made of the dissolved Al concentration in the steel material so that the foregoing Al concentration could remain within a prescribed range.

After the molten steel processing, samples were taken from the top slag, and at the same time, ingots (20 tons and 50 tons) were cast by the bottom pouring process. Upon completion of solidification, ingots were taken out from the casting mold and made to undergo hot forging at a temperature of 1,150° C. or over; thus, from 20-ton ingots, hot-forged round-bar like product having a diameter of 400-500 mm was finished, and from 50-ton ingots, hot-forged round-bar like product having a diameter of 500-600 mm was finished.

Each sample of forged material was put to chemical analysis for chemical composition. Also, each sample of the top slag was subjected to ICP emission spectral analysis for examination of MgO concentration.

Results from these analysis and examination are summarized in Table 1 shown below, in which the values of Al concentrations in molten steel are also included.

TABLE 1

| Steel No. | Mass | Chemical Composition (mass %) | | | | | | | | | | Concentration of MgO in Slug (mass %) | Concentration of Al in Molten Steel (mass ppm) |
|---|---|---|---|---|---|---|---|---|---|---|---|---|---|
| | | C | Si | Mn | P | S | Cu | Ni | Cr | Mo | V | | |
| 1 | 20 ton | 0.40 | 0.25 | 1.02 | 0.009 | 0.002 | 0.03 | 0.21 | 1.99 | 0.25 | 0.09 | 15 | 200 |
| 2 | 20 ton | 0.40 | 0.29 | 1.00 | 0.009 | 0.001 | 0.03 | 0.20 | 0.95 | 0.24 | 0.08 | 11 | 360 |
| 3 | 50 ton | 0.43 | 0.18 | 0.74 | 0.006 | 0.002 | 0.04 | 0.72 | 1.13 | 0.27 | 0.09 | 10 | 110 |
| 4 | 20 ton | 0.40 | 0.25 | 1.01 | 0.011 | 0.002 | 0.03 | 0.21 | 1.98 | 0.25 | 0.10 | 13 | 430 |
| 5 | 20 ton | 0.40 | 0.24 | 0.99 | 0.009 | 0.001 | 0.03 | 0.20 | 1.98 | 0.25 | 0.10 | 13 | 460 |
| 9 | 20 ton | 0.41 | 0.22 | 1.00 | 0.010 | 0.002 | 0.03 | 0.21 | 1.95 | 0.26 | 0.11 | 18 | 350 |
| 7 | 20 ton | 0.35 | 0.22 | 0.87 | 0.011 | 0.003 | 0.04 | 1.61 | 1.60 | 0.51 | 0.16 | 21 | 320 |
| 8 | 20 ton | 0.40 | 0.22 | 0.98 | 0.006 | 0.003 | 0.03 | 0.19 | 1.98 | 0.23 | 0.06 | 17 | 200 |
| 9 | 20 ton | 0.40 | 0.24 | 0.99 | 0.008 | 0.002 | 0.02 | 0.22 | 1.98 | 0.24 | 0.10 | 20 | 290 |
| 10 | 20 ton | 0.39 | 0.45 | 1.11 | 0.004 | 0.002 | 0.03 | 0.19 | 1.95 | 0.25 | 0.10 | 6 | 80 |
| 11 | 50 ton | 0.45 | 0.30 | 1.00 | 0.010 | 0.003 | 0.01 | 0.75 | 1.60 | 0.18 | 0.10 | 15 | 560 |
| 12 | 20 ton | 0.46 | 0.27 | 0.80 | 0.008 | 0.008 | 0.03 | 0.21 | 0.24 | 0.06 | 0.01 | 11 | 10 |
| 13 | 20 ton | 0.41 | 0.29 | 1.02 | 0.007 | 0.003 | 0.03 | 0.22 | 2.01 | 0.25 | 0.05 | 6 | 50 |
| 14 | 20 ton | 0.40 | 0.23 | 1.11 | 0.003 | 0.002 | 0.02 | 0.21 | 2.02 | 0.26 | 0.10 | 3 | 210 |
| 15 | 20 ton | 0.45 | 0.26 | 0.80 | 0.007 | 0.005 | 0.02 | 0.16 | 0.17 | 0.06 | 0.01 | 1 | 330 |

TABLE 1-continued

| Steel | | Chemical Composition (mass %) | | | | | | | | | | Concentration of MgO | Concentration of Al in |
|---|---|---|---|---|---|---|---|---|---|---|---|---|---|
| No. | Mass | C | Si | Mn | P | S | Cu | Ni | Cr | Mo | V | in Slug (mass %) | Molten Steel (mass ppm) |
| 16 | 20 ton | 0.36 | 0.30 | 1.20 | 0.004 | 0.004 | 0.03 | 0.30 | 1.90 | 0.25 | 0.11 | 3 | 320 |
| 17 | 20 ton | 0.40 | 0.26 | 1.02 | 0.003 | 0.002 | 0.03 | 0.22 | 1.94 | 0.25 | 0.10 | 12 | 580 |

While the dissolved Mg concentration and the dissolved Al concentration in the ingots respectively were checked, the composition of inclusions in the forged parts, fatigue tests, and measuring of sizes of inclusions were also conducted by the under-mentioned methods. At the same time, examinations were also made of the total Mg concentrations in the steel by ICP-mass spectrometry (ICP-MS Method).

[Measuring of Dissolved Mg Concentration and Dissolved Al Concentration in Steel]

Samples collected from the ingots were ground and loaded in the secondary ion mass spectrometer ("ims5f" made by CAMECA); then, with respect to each sample, observation was made of the secondary ion images of Mg and Al in a region of 500×500 ($\mu m^2$); namely, within the aforesaid region, three locations where Mg and Al were not incrassate were selected to receive depth-wise analysis. The primary ion source in this case was $O^2+$. If the depth-wise distribution of concentration was uniform, that uniform value was taken as the concentration in dissolved state. If any inclusions were found in the course of the depth-wise analysis, concentration would show a large fluctuation. In such a case, analysis was proceeded deeper to where no inclusion was found, and when distribution of concentration reached a constant state, the value of concentration at that time was taken as the dissolved concentration. Additionally, in regard to the quantitative determination method for concentration, pure iron into which ions of $^{24}Mg$ (150 keV, $1\times10^{14}$ atoms/$cm^2$) and $^{27}Al$ (200 keV, $1\times10^{14}$ atoms/$cm^2$) were injected was measured as the standard specimen, and the relative sensitivity coefficient available therefrom was used to measure atomic concentration.

[Analysis of Composition of Inclusions]

Samples were cut out from the center part in the location corresponding to the ingot bottom of the round bar after forging, and such samples were used for composition analysis of inclusions by means of the EPMA. In conducting the analysis, 50 pieces or more of inclusions were randomly collected for each sample for the composition analysis, with the result expressed in average values.

[Fatigue Tests and Measurement of Inclusion Size]

In regard to a round bar after forging, smooth specimen was cut out from the center part in the location corresponding to the ingot bottom in a size of 10 mm in diameter in the radius direction of the bar and 30 mm in length, and the specimen was subjected to the fatigue test on the following conditions. Another specimen obtained from the same location as the first specimen was used in conducting the tensile test at normal temperature. As an index of fatigue limit, endurance limit ratio (fatigue strength $\sigma_W$/tensile strength $\sigma_B$) was measured.

Test method: Rotating bending fatigue test (stress ratio=−1, revolutions: 3600 rpm)

Fatigue strength evaluation method: Difference method

Difference stress: 20 MPa

Initial stress: 300 MPa

Number of specimens: 5 pieces each

Fatigue strength of each specimen: =(Rupture stress)−(Difference stress)

After the fatigue test, the fatigue fracture surface was observed by a scanning electron microscope (SEM), and the sizes of inclusions existing in the starting point of the fatigue fracture surface were measured to find the cross-sectional area of the inclusions to the one-half power as $\sqrt{A}$. At the same time, examination was also made about existence or non-existence of MgS-contained coarse and large inclusions.

These results are summarized in the Table 2 shown below. Steel Nos. 1-11 are in compliance with the requirements set forth in the present invention. It is evident that excellent endurance limit ratio ($\sigma_W/\sigma_B$ is 0.42 or over) is attained because of much refined inclusions. On the contrary, steel Nos. 12-17 which lack some of the requirements of the present invention are clear about having failed to achieve refinement of inclusions and about remaining only at low level in endurance limit ratio ($\sigma_W/\sigma_B$ is 0.40 or less).

TABLE 2

| Steel | Concentration of Dissolved Mg in Steel | Concentration of Dissolved Al in Steel | Concentration of Total Mg in Steel | Existence or Non-existence of MgS-contained Rough | Composition of Oxide in Forged Parts (mass %) | | | |
|---|---|---|---|---|---|---|---|---|
| No. | (mass ppm) | (mass ppm) | (mass ppm) | and Large Sulfide | MgO | $Al_2O_3$ | $SiO_2$ | CaO |
| 1 | 0.59 | 180 | 3 | No | 23 | 75 | 0.5 | 1 |
| 2 | 0.50 | 306 | 5 | No | 68 | 23 | 0.9 | 7 |
| 3 | 0.38 | 89 | 4 | No | 22 | 50 | 0.5 | 26 |
| 4 | 1.20 | 370 | 10 | No | 40 | 31 | 0.4 | 23 |
| 5 | 1.90 | 420 | 3 | No | 35 | 33 | 1.0 | 30 |
| 9 | 0.67 | 310 | 17 | No | 79 | 13 | 0.3 | 6 |
| 7 | 0.89 | 270 | 1 | No | 12 | 64 | 1.0 | 18 |
| 8 | 0.45 | 146 | 3 | No | 17 | 57 | 1.5 | 23 |
| 9 | 0.15 | 220 | 1 | No | 11 | 80 | 0.3 | 4 |
| 10 | 0.05 | 60 | 1 | No | 5.5 | 45 | 6.0 | 42 |
| 11 | 4.55 | 480 | 8 | No | 81.5 | 8 | 0.2 | 10 |
| 12 | 0.01 | 6 | 1 | No | 9 | 22 | 30 | 29 |
| 13 | 0.02 | 35 | 1 | No | 12 | 24 | 29 | 29 |
| 14 | 0.03 | 180 | 3 | No | 2 | 94 | 1 | 2 |
| 15 | 0.02 | 290 | 15 | No | 1.1 | 95 | 0.5 | 0.5 |

TABLE 2-continued

| | | | | | | | | |
|---|---|---|---|---|---|---|---|---|
| 16 | 10 | 150 | 25 | Yes | 5.4 | 40 | 2.5 | 0.3 |
| 17 | 29 | 510 | 31 | Yes | 80 | 0 | 3.8 | 0.6 |

| Steel No. | Composition of Oxide in Forged Parts (mass %) | | Size of Inclusion in Fatigue-fractured Surface ($\sqrt{A}$: μm) | Fatigue Strength $\sigma_W$ (MPa) | Tensile Strength $\sigma_B$ (MPa) | Durability Limit Ratio ($\sigma_W/\sigma_B$) |
|---|---|---|---|---|---|---|
| | Total | MgO + Al$_2$O$_3$ | | | | |
| 1 | 99.0 | 98 | 30 | 540 | 1080 | 0.500 |
| 2 | 99.0 | 91 | 38 | 400 | 825 | 0.485 |
| 3 | 98.5 | 72 | 64 | 380 | 792 | 0.480 |
| 4 | 94.4 | 71 | 55 | 420 | 877 | 0.479 |
| 5 | 99.0 | 68 | 72 | 500 | 1055 | 0.474 |
| 9 | 98.4 | 92 | 45 | 480 | 1043 | 0.460 |
| 7 | 95.0 | 76 | 110 | 480 | 1060 | 0.453 |
| 8 | 98.5 | 74 | 59 | 420 | 929 | 0.452 |
| 9 | 95.3 | 91 | 99 | 400 | 889 | 0.450 |
| 10 | 98.5 | 51 | 142 | 420 | 977 | 0.430 |
| 11 | 99.7 | 90 | 155 | 400 | 937 | 0.427 |
| 12 | 89.8 | 32 | 201 | 340 | 850 | 0.400 |
| 13 | 93.4 | 36 | 236 | 360 | 960 | 0.321 |
| 14 | 99.1 | 96 | 220 | 360 | 1029 | 0.375 |
| 15 | 97.1 | 96 | 290 | 340 | 1059 | 0.350 |
| 16 | 96.8 | 94 | 310 | 380 | 1050 | 0.362 |
| 17 | 84.7 | 80 | 357 | 340 | 942 | 0.361 |

Based on the above-shown results, the relation between $\sqrt{A}$ of the inclusions in the fracture surface and the endurance limit ratio is shown in FIG. 1. The graph evidences that refining in size (160 μm or below at $\sqrt{A}$) of the inclusions is effective for improving the endurance limit ratio.

FIG. 2 shows the relation between the dissolved Mg concentration in the steel and endurance limit ratio. The graph indicates that if the dissolved Mg concentration in the steel exceeds a specified value (5 ppm by mass), coarse and large sulfides (MgS) are generated leading to lowering of the endurance limit ratio. Also, if the dissolved Mg concentration in the steel underruns a specified value (0.04 ppm by mass), coagulative oxides (refer to Table 2 for details of the oxides) are generated, leading here again to lowering of the endurance limit ratio.

FIG. 3 shows the effects that the concentration of (MgO+Al$_2$O$_3$) and the concentration of MgO in the oxides exert on the endurance limit ratio. FIG. 3, however, does not plot Steel Nos. 16 and 17 for which generation of coarse and large sulfides were confirmed. As is clear from the above result, it is possible to secure a high endurance limit ratio if the concentration of (MgO+Al$_2$O$_3$) and the concentration of MgO in the oxides are kept at specified values or over respectively. Conversely, any steel that has acquired a high endurance limit ratio naturally has very fine inclusions (refer to FIG. 1).

FIG. 4 is a graph showing the effect which the dissolved Al concentration in the steel gives to the dissolved Mg concentration in the steel. As is clear from this graph, it has been found that if the MgO concentration in the slag is less than 5%, a target concentration of the dissolved Mg is not achievable. Also, when the MgO concentration in the slag was 5% or over, the target concentration of the dissolved Mg was certainly achieved by controlling the dissolved Al concentration in the steel within 50-500 ppm by mass.

Figure 5:
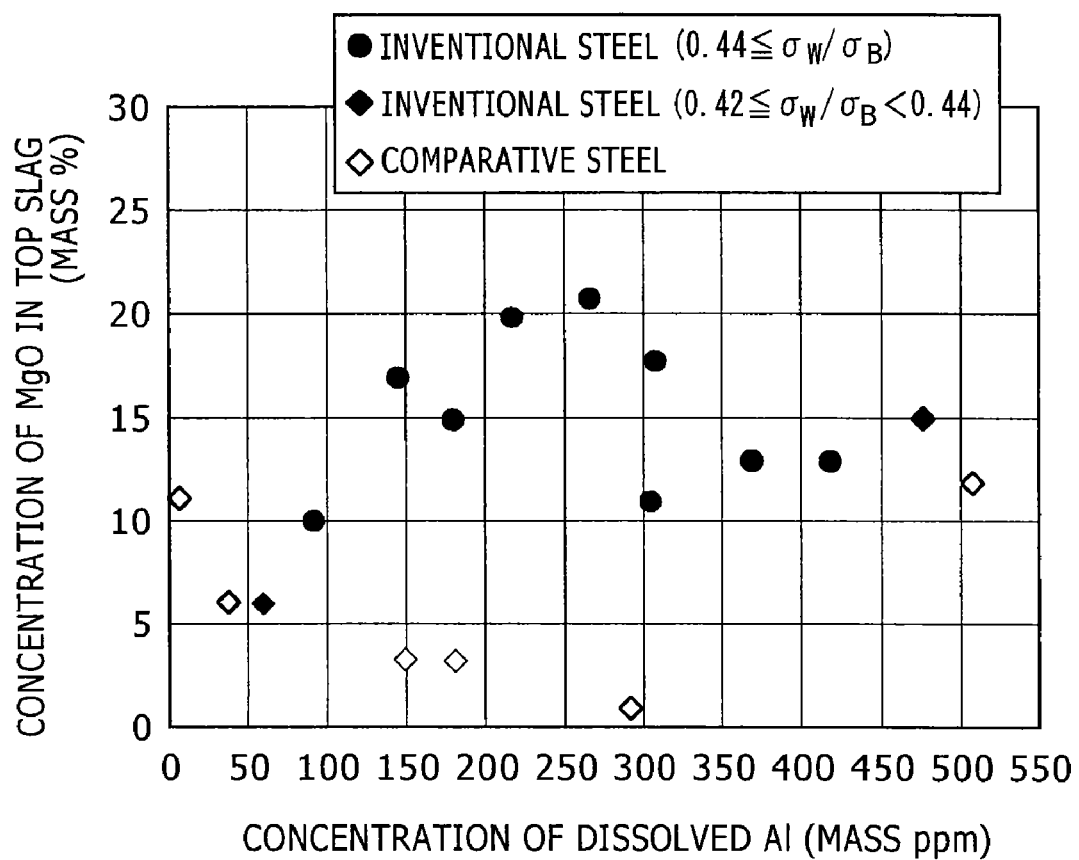
FIG. 5 is a graph showing the effect that the concentration of Al in the steel and the concentration of MgO in the top slag give to endurance limit ratio.

FIG. 5 shows the effect that the concentration of dissolved Al in the steel and the concentration of MgO in the top slag exert on the endurance limit ratio. From this result, it is clear that a high endurance limit ratio can be attained when the MgO concentration in the top slag is 5% by mass or over and the dissolved Al concentration in the steel is controlled within the range of 50-500 ppm by mass.

Figure 6:
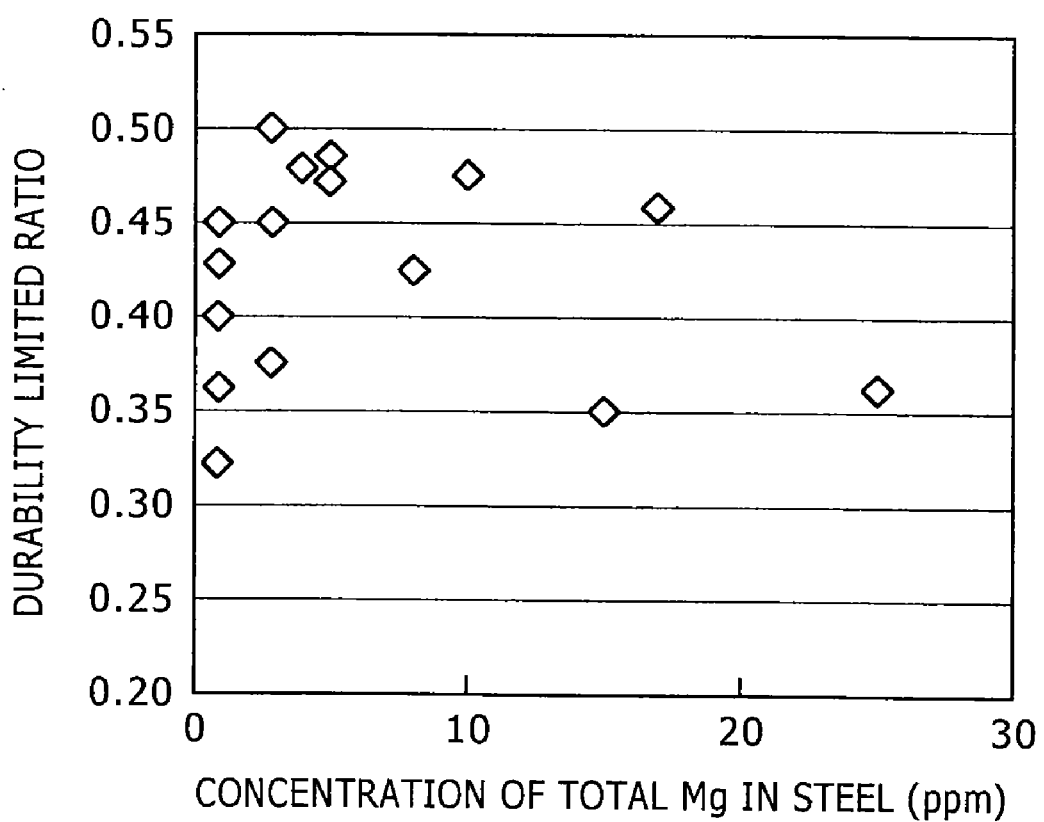
FIG. 6 is a graph showing the relation between the total Mg concentration in the steel and the endurance limit ratio.

FIG. 6 shows the relation between the total Mg concentration in the steel and the endurance limit ratio. As is clear from the result, there is only low correlation between the total Mg concentration and endurance limit ratio. The result proves that control of the dissolved Mg concentration in the steel (refer to FIG. 2) is highly effective for improvement of endurance limit ratio.

The invention claimed is:

1. A forging steel consisting of C: 0.2-1.0% Si: 0.05-0.6%; Mn: 0.2-1.5%; Ni: 4% or below (but not including 0%); Cr: 0.5-4%; Mo: 0.1-1.5%; and V: 0.005-0.3% respectively, while the remainder is Fe and the inevitable impurities, wherein the forging steel has a dissolved Mg concentration is from 0.05 to 5 ppm and a dissolved Al concentration from 50 to 500 ppm; and oxide inclusions having an average composition satisfying the following formulas (1) and (2):

$$[MgO]+[Al_2O_3] \geq 40\% \quad (1)$$

$$[MgO] \geq 5\% \quad (2)$$

provided [MgO] and [Al$_2$O$_3$] respectively denote the mass amounts in percent of MgO and Al$_2$O$_3$.

2. The forging steel according to claim 1, wherein, in defining the cross-sectional area of the oxide type inclusions present in the steel as A (μm$^2$), the average value of $\sqrt{A}$ is 160 μm or below.

3. Forged parts or products manufactured from the forging steel according to claim 1.

4. The forged parts or products according to claim 3, wherein said forged parts or products are solid crankshafts.

5. A method for manufacturing the forging steel of claim 1, comprising:

during the melt processing of a steel consisting C: 0.2-1.0% Si: 0.05-0.6%; Mn: 0.2-1.5%; Ni: 4% or below (but not including 0%); Cr: 0.5-4%; Mo: 0.1-1.5%; and V: 0.005-0.3% respectively, while the remainder is Fe and the inevitable impurities, maintaining a MgO concentration in a top slag during the molten steel processing is maintained at 5 mass % or greater; and at the same time controlling Al concentration in the molten steel so that the dissolved Al concentration in the steel is maintained at 50-500 ppm.

6. The forging steel according to claim 1, comprising C: 0.3-0.5% Si: 0.05-0.4%; Mn: 0.4-1.2%; Ni: 2% or below (but not including 0%); Cr: 0.9-2.5%; Mo: 0.15-1.5%; and V: 0.005-0.15% respectively, while the remainder is Fe and the inevitable impurities.

7. The method according to claim 5, wherein the steel comprises C: 0.3-0.5% Si: 0.05-0.4%; Mn: 0.4-1.2%; Ni: 2% or below (but not including 0%); Cr: 0.9-2.5%; Mo: 0.15-1.5%; and V: 0.005-0.15% respectively, while the remainder is Fe and the inevitable impurities.

8. Forged parts or products manufactured from the forging steel according to claim 2.

9. The forged parts or products according to claim 8, wherein said forged parts or products are solid crankshafts.

10. Forged parts or products manufactured from the forging steel according to claim 6.

11. The forged parts or products according to claim 10, wherein said forged parts or products are solid crankshafts.

* * * * *